(12) United States Patent
Fujimura et al.

(10) Patent No.: US 9,116,318 B2
(45) Date of Patent: Aug. 25, 2015

(54) OPTICAL MODULE WITH DEVICE UNIT ELECTRICALLY ISOLATED FROM OPTICAL RECEPTACLE

(75) Inventors: Yasushi Fujimura, Yokohama (JP); Toshio Takagi, Yokohama (JP); Tamaki Wakasaki, Yokohama (JP); Masanobu Kawamura, Yokohama (JP)

(73) Assignee: SUMITOMO ELECTRIC INDUSTRIES, LTD., Osaka-shi (JP)

( * ) Notice: Subject to any disclaimer, the term of this patent is extended or adjusted under 35 U.S.C. 154(b) by 232 days.

(21) Appl. No.: 13/468,623

(22) Filed: May 10, 2012

(65) Prior Publication Data

US 2012/0288239 A1    Nov. 15, 2012

(30) Foreign Application Priority Data

May 11, 2011   (JP) .................................. 2011-105994
May 11, 2011   (JP) .................................. 2011-106002

(51) Int. Cl.
 *G02B 6/36* (2006.01)
 *G02B 6/42* (2006.01)

(52) U.S. Cl.
 CPC ............ *G02B 6/4292* (2013.01); *G02B 6/4237* (2013.01); *G02B 6/4275* (2013.01); *G02B 6/4206* (2013.01); *G02B 6/4214* (2013.01); *G02B 6/4246* (2013.01)

(58) Field of Classification Search
 CPC .. G02B 6/4201; G02B 6/4204; G02B 6/4206; G02B 6/4214; G02B 6/4237; G02B 6/4246; G02B 6/4249; G02B 6/4275; G02B 6/4292; H04B 10/00

USPC .......................... 385/14, 55, 73–94, 135–139
See application file for complete search history.

(56) References Cited

U.S. PATENT DOCUMENTS

| 7,217,042 B2 | 5/2007 | Okada et al. |
| 2009/0304337 A1 | 12/2009 | Sato |
| 2010/0232749 A1 | 9/2010 | Sabbatino et al. |
| 2012/0039570 A1 | 2/2012 | Matsumoto et al. |

FOREIGN PATENT DOCUMENTS

| CN | 1809774 A | 7/2006 |
| CN | 101561538 A | 10/2009 |
| JP | 2004-354752 A | 12/2004 |
| JP | 2004-354908 A | 12/2004 |

(Continued)

OTHER PUBLICATIONS

Notification of Reasons for Rejection issued in Japanese Patent Application No. 2011-105994 dated Jan. 27, 2015.

(Continued)

*Primary Examiner* — Akm Enayet Ullah
*Assistant Examiner* — Michael Mooney
(74) *Attorney, Agent, or Firm* — Venable LLP; Michael A. Sartori; Trent B. Ostler (57) ABSTRACT

An optical module is disclosed where an optical coupling efficiency between an optical device and an external fiber may be improved. The optical module includes an optical receptacle and a device unit assembled with the optical receptacle only via a stub as forming a gap to isolate these two components. The gap is filled with insulating resin or tightly covered by an insulating ring to reinforce the stub to be hard for an increased moment by the optical assemblies in the device unit.

11 Claims, 7 Drawing Sheets

(56) References Cited

FOREIGN PATENT DOCUMENTS

| | | | | |
|---|---|---|---|---|
| JP | 2006-084683 | | 3/2006 | |
| JP | 2006119577 | * | 5/2006 | .............. G02B 6/42 |
| JP | 2006-184339 A | | 7/2006 | |
| JP | 2007-133225 | | 5/2007 | |
| JP | 2007-232975 | | 9/2007 | |
| JP | 2009-058555 | | 3/2009 | |
| JP | 2009-222893 A | | 10/2009 | |
| JP | 2009-294419 | | 12/2009 | |
| JP | 2010-181867 A | | 8/2010 | |

OTHER PUBLICATIONS

Notification of Reasons for Rejection issued in Japanese Patent Application No. 2011-106002 dated Jan. 27, 2015.

Notification of the First Office Action of the Chinese Patent Application No. 201210144516.4, dated Feb. 16, 2015.

* cited by examiner

OPTICAL MODULE WITH DEVICE UNIT ELECTRICALLY ISOLATED FROM OPTICAL RECEPTACLE

BACKGROUND OF THE INVENTION

1. Field of the Invention

The present invention relates to an optical module that includes a plurality of optical assemblies and an optical receptacle; in particular, the invention relates to an optical module whose device unit is electrically isolated from the optical receptacle.

2. Related Prior Arts

A Japanese Patent published as JP-2007-133225A has disclosed an optical module having an optical receptacle for receiving an external optical fiber and an optical assembly coupled with the external fiber via the optical receptacle.

Figure 7A:
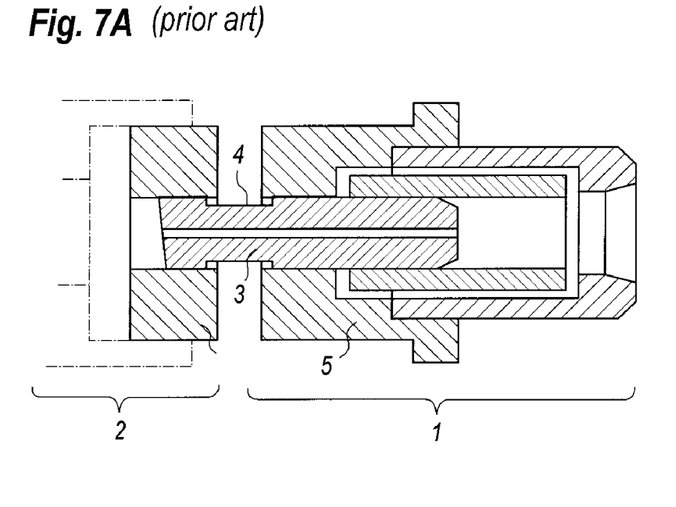
FIGS. 7A and 7B show a cross section of respective conventional optical receptacles.
Figure 7B:
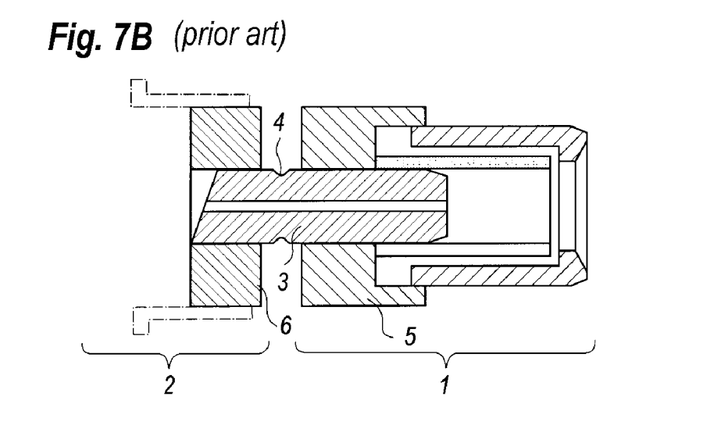

The optical receptacle disclosed therein, as shown in FIGS. 7A and 7B, has a stub 3 made of electrically insulating material. The holder 5 and the bush 6, where they are made of metal, are press-fitted into a root portion of the stub 4 as keeping a gap 4 thererbetween. Thus, the bush 6 physically and electrically connected with the optical assemblies, which are not shown in FIGS. 7A and 7B, may be electrically isolated from the holder 5, or the optical receptacle 1 which is physically and electrically connected to the host system to enhance the tolerance of the optical modulate against the electro-magnetic interference (EMI).

However, the arrangement of the optical receptacle 1 shown in FIGS. 7A and 7B, shows lesser mechanical tolerance when the bush 6 is physically assembled with a device unit that includes a plurality of optical assemblies and other optical components, because such a device unit is unavoidable to increase the weight thereof. The present application is to provide an improved arrangement of the optical receptacle showing substantial mechanical tolerance even when the device unit includes a plurality of optical assemblies and increases the weight thereof.

SUMMARY OF THE INVENTION

An aspect of the present invention relates to an optical module that provides an optical receptacle and a device unit. The optical receptacle includes a stub, a holder, and a bush; while, the device unit includes at least two optical assemblies each coupled with an external fiber set in the optical receptacle. Two members, namely, the optical receptacle and the device unit, are assembled with each other only through the stub. That is, the holder and the bush are press-fitted into the stub as forming a gap therebetween; while, the device unit is welded to the bush.

A feature of the embodiments according to the present invention is that the gap between the holder and the bush of the optical receptacle is filled with a material to reinforce the stub.

The optical module of the embodiment includes a plurality of optical assemblies in the device unit, which increases the weight thereof and the resultant moment applied to the stub. Moreover, the optical module, especially, the optical assemblies is necessary to be isolated electrically from the housing of the system where the optical module is installed therein. Then, the metal holder set in the housing of the system and the metal bush welded to the device unit are required to be isolated electrically to each other; and the stub set in the holder and made of ceramics may effectively isolate the metal bush from the metal holder.

However, when the impact or the stress is caused in the optical receptacle, in particular, along the directions perpendicular to the optical axis of the receptacle, the optical coupling efficiency is easily to degrade because the device unit becomes heavier compared to a conventional optical module with the single optical assembly.

The optical module according to the embodiments of the invention provides a substance filling the gap between the holder and the bush. The substance may be a resin hardened by the thermo-setting, or an insulating ring preferably made of ceramics such as zirconia. Because the gap between the holder and the bush, where the stub is exposed, is filled with the resin, or tightly covered by the ring, the stub may be reinforced by the substance.

BRIEF DESCRIPTION OF THE DRAWINGS

The foregoing and other purposes, aspects and advantages will be better understood from the following detailed description of a preferred embodiment of the invention with reference to the drawings, in which.

DESCRIPTION OF EMBODIMENTS

Next, some embodiments of an optical module according to the present invention will be described. In the description of the drawings, the same or like numerals or symbols will refer to the same or like elements without overlapping explanations.

First Embodiment

Figure 1:
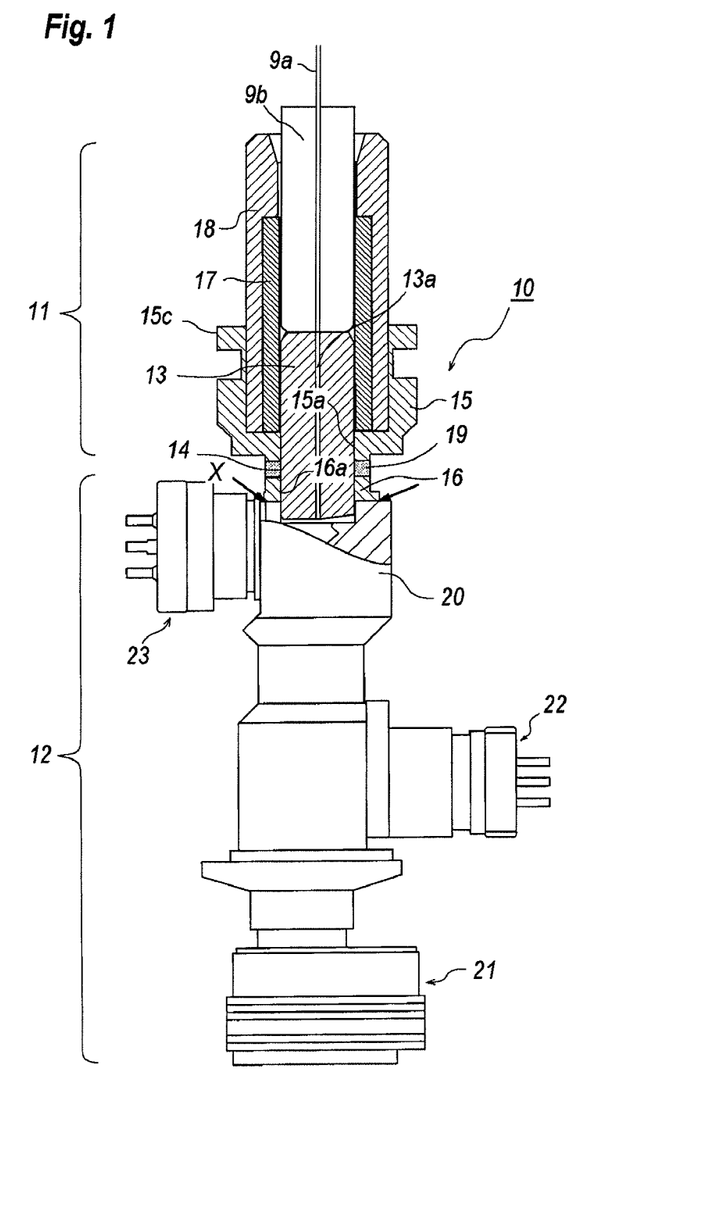
FIG. 1 shows a cross section of an optical module according to an embodiment of the invention.

An optical module 10 according to an embodiment includes an optical receptacle 11, and a device unit 12. The optical receptacle 11 comprises a stub 13 with a coupling fiber 13a in a center thereof; a sleeve 17 set in a top portion of the stub 13; a metal shell 18 for covering the sleeve 17; a holder 15; and a bush 16. The device unit 12 comprises a housing 20, and a plurality of optical assemblies, 21 to 23. As shown in the figures, a feature of the present invention is that the optical module 10 assembles the optical receptacle 11 with the device unit 12 solely by the stub 13.

As described, the optical receptacle includes the sleeve 17, the stub 13 a front portion of which is inserted in to the sleeve 17, the holder 15 press-fitted into the stub 13, and the metal shell 18 for covering the sleeve 17. The sleeve 17 may be made of, for instance, ceramics such as zirconia and have a type of, what is called as, a split sleeve with a slit along the axis thereof. The split sleeve may radially expand by widening the slip. The sleeve 17 may align an optical ferrule 9b, exactly an external fiber secured in the ferrule 9b which are not explicitly illustrated in the figures, inserted therein with the coupling fiber 13a.

The holder 15, which may be made of metal, has an opening 15a into which the stub 13 is press-fitted. The holder 15 may hold the sleeve 17 and the metal shell 18 and have a flange 15c to be assembled with a host system. Because the holder 15 and the shell 18 are made of metal, and the holder is set in the host system, these two members, 15 and 18, may electrically shield the device unit 12 within the host system. The shell 18 with the sleeve 13 may be press-fitted between the holder 14 and the stub 13.

The optical assemblies, 21 to 23, may be assembled with the housing made of metal. In an embodiment, the first optical assembly 21 is a transmitter optical assembly installing a semiconductor device of a type of, what is called, the EML (Electro-absorption Modulator Integrated Laser Diode) operable at 10 Gbps at a wavelength of 1577 nm. The second optical assembly 22 may install an LD directly modulated, which is generally called as the DML (Direct Modulation Laser Diode), operable at 1 Gbps and the wavelength of 1490 nm. The third assembly 23 may install a photodiode (PD) operable at 10 Gbps and a wavelength of 1270 nm, or at 1 Gbps and a wavelength of 1310 nm.

These optical assemblies, 21 to 23, may be optically coupled with the coupling fiber 13a via an optical isolate, a wavelength division multiplexing filer, a lens, and so on installed within the housing 20. The optical assemblies, 21 to 23, may be fixed with the housing 20 with, for instance, the YAG-laser welding or adhesives after optically aligned with the coupling fiber 13a.

The housing 20 may be fixed to a bush 16, which is press-fitted with a rear portion of the stub 13, by the YAG laser welding at corners indicated by arrows X after the optical alignment between the coupling fiber 13a and the optical assemblies, 21 to 23.

The stub 13 may be made of electrically insulating material such as zirconia same as the sleeve 17 of the optical receptacle 11. The stub 13 provides the coupling fiber 13a in the center thereof. Because the optical assemblies, 21 to 23, are optically coupled in an end 16b of the coupling fiber 13a, while, the external fiber 9a is in physically contact with the other end of the coupling fiber 13a, the optical assemblies, 21 to 23, may be optical coupled with the external fiber 9a via the coupling fiber 13a. The stub 13 of the present embodiment has a feature that, not only optically couples the optical assemblies, 21 to 23, with the external fiber 9a as described above, but physically assembles the optical receptacle 11 with the device unit 12.

The mechanical function of the stub 13 will be further described. The bush 16 and the holder 15, where both of them are press-fitted with the stub 13, are assembled with a gap 14 therebetween. Although the holder 15 and the bush 16 are made of metal, the gap 14 may electrically isolate two parts, 15 and 16, because the stub is made of ceramics. The present embodiment has a feature that an electrically insulating resin fills the gap 14, which may equivalently lengthen a functional length of the stub 13 to support the holder 15 and the device unit 12. The arrangement of the stub 13 with the gap 14 of the embodiment may reinforce the hardness of the optical module 1.

Figure 2A:
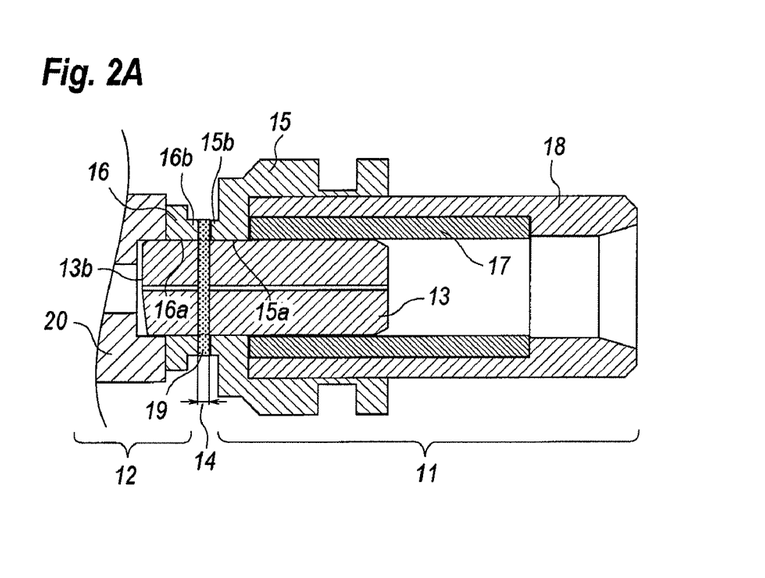
FIG. 2A magnifies a root portion of the optical receptacle.
Figure 2B:
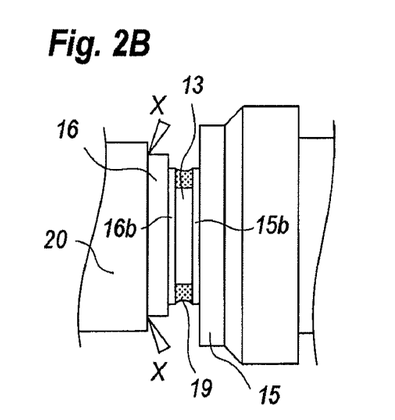
FIG. 2B shows a modified arrangement of the holder and the bush.
Figure 2C:
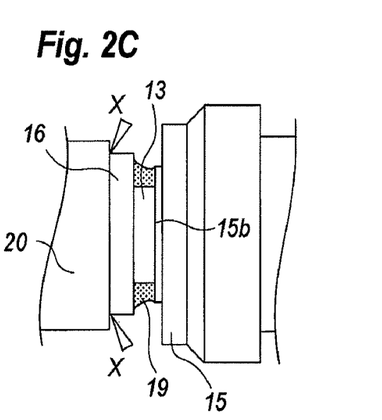
FIG. 2C shows still another modified arrangement of the holder and the bush.

FIGS. 2A to 2C magnify the arrangement around the gap 14, where FIG. 2A is a cross section, and FIGS. 2B and 2C show some modifications of the arrangement.

The stub 13 is press-fitted into the opening 15a of the holder 15 and into the opening 16a of the bush 16, where the holder 15 is apart from the bush 16 by a preset distance of the gap 14 filled with the insulating resin. An excess length from the end of the bush 16 to the end 13b of the stub 13 protruding from the bush 15 may be controlled by using a particular tool.

The resin 19 filling the gap 14 may be hardened by, for instance, thermal treatment when the resin 19 is the type of a thermosetting resin. The hardened resin 19 in the gap 14 may reinforce the stub 13 to unite the device unit 12 to the optical receptacle 11. Even when the device unit 12 includes a plurality of optical assemblies and other optical components, which makes the weight of the device unit heavier and increases the moment applied to the stub 13 and the optical receptacle 11; the hardened resin may effectively suppress the deformation of the stub 13. The hardened resin 19 in the gap 14 equivalently expands a length contributed to the press fitting, the deformation of the stub 13, or the misalignment between the external fiber 9a and the device unit 12 may be effectively suppressed.

In modified arrangement of the embodiment, the holder 15 may provide a step 15b in a side facing the bush 16, while, the bush 16 may also a step 16b in a side facing the holder 14. These steps, 15b and 16b, may define the gap 14, and a space put between the steps, 15b and 16b, may be filled with the resin. The steps, 15b and 16b, may effectively prevent the resin from sticking out from the gap 14.

As described in FIG. 1, the bush 15 may be welded by the YAG laser to the device unit 20 at corners denoting by arrows X in FIGS. 2B and 2C. Because the resin 19 has a diameter determined by the diameter of the steps, 15b and 16b, the resin 19 does not interfere the YAG laser welding. Thus, the resin 19 may be functionally isolated from the YAG laser welding, which may make the resin free from the deterioration and droplets during the welding to prevent the resin 19 from reducing the isolation voltage.

Although the embodiment shown in FIG. 2B provides the step 15b in the holder 15 and the other step 16b in the bush; the optical module in another embodiment may provide only one of steps, 15b and 16b, to control the diameter of the resin 19. An arrangement where only the holder 15 provides the step 15b is preferable because the resin 19 becomes relatively freer from the YAG laser beams.

Figure 3A:
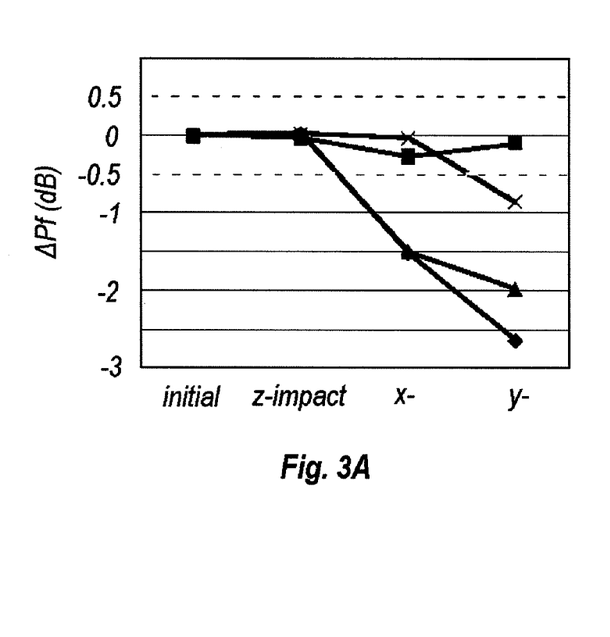
FIGS. 3A and 3B show variation of the optical coupling efficiency between the external fiber and the optical device after affecting an impact along respective directions.
Figure 3B:
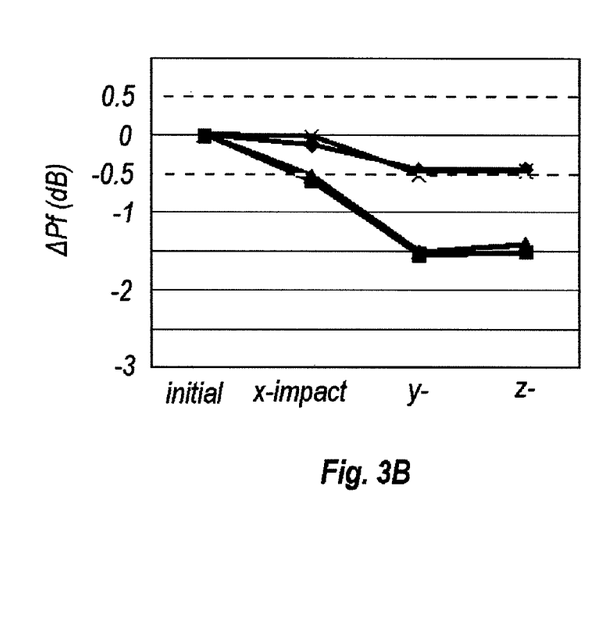

Results of the hardened resin 19 filling the gap 14 were verified in series of experiments. First, an original receptacle without resin 19 in the gap 14 was investigated. The measurements were performed for the optical receptacle with the sleeve 13 of 6.38 mm, the gap 14 of 0.35 mm and a length of the opening 16a of the bush of 0.84 mm. FIGS. 3A and 3B show the variation of the optical coupling efficiency ΔPf in an initial state thereof and after applying impact of 500 G along three co-ordinates, where Z-direction is along the optical axis of the sleeve and other two directions is in perpendicular thereto.

As shown in FIGS. 3A and 3B, the optical coupling efficiency degrades after the impact along X- and Y-directions are applied, while, the variation of the coupling efficiency is dull, or within an error margin, for the impact along the Z-direction. Over 1.5 dB degradation was observed after the impact along X- and Y-directions.

Figure 4:
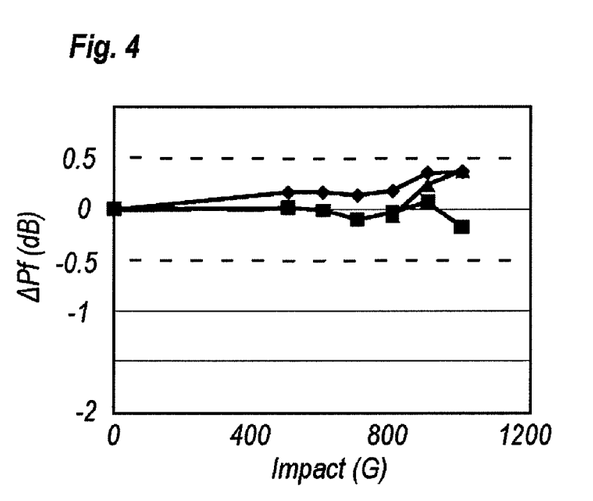
FIG. 4 shows variation of the optical coupling efficiency of the optical receptacle after affecting the impact, where the gap is filled with a resin.

FIG. 4 shows a variation of the coupling efficiency for the optical receptacle that fills the gap 14 with the resin 19, namely, the arrangement according to an embodiment of the invention. The optical receptacle of the embodiment did not show substantial degradation in the coupling efficiency even after the impact along X- or Y-direction was applied. So, FIG. 4 shows the variation of the coupling efficiency as the impact increases. As shown in FIG. 4, the optical receptacle with the hardened resin 19 filling the gap 14 shows no degradation of the coupling efficiency even the impact of 1000 G is applied thereto.

Second Embodiment

Figure 5A:
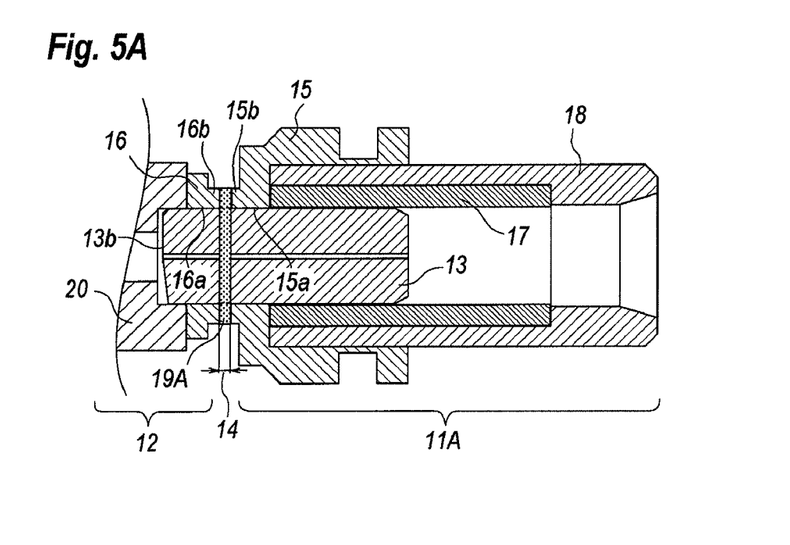
FIG. 5A magnifies a root portion of the optical receptacle according to the second embodiment of the invention, where the optical receptacle provides an insulating ring set in the gap, and FIGS. 5B and 5C each shows a modification of the second embodiment.
Figure 5B:
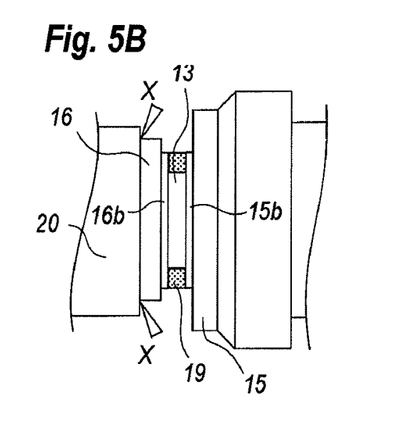
Figure 5C:
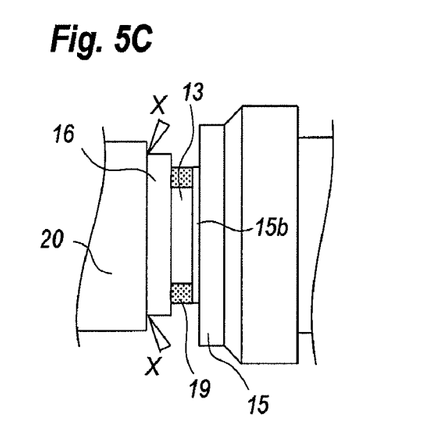

FIGS. 5A to 5C magnify the root portion of the optical receptacle 11A according to the second embodiment of the invention, where FIG. 5A is a cross section, while, FIGS. 5B and 5C show modifications of the second embodiment.

As shown in FIG. 5A, the optical receptacle 11A of the second embodiment provides a insulating ring 19A, instead of the insulating resin 19 in the aforementioned embodiment, to fill the gap 14 between the holder 15 and the bush 16. The insulating ring 19A may be press-fitted into the stub 13 with a fitting strength less than that for the holder 15 and the bush 16.

The bush 16 may be press-fitted into the root portion of the stub 15 so as to abut against the ring 19A. Then, the ring 19A may be tightly fixed between the holder 15 and the bush 16, namely, the ring 19A comes in tightly contact with the holder 15 in a surface thereof, while, also in tightly contact with the bush in another surface.

Because the ring 19A may be made of electrically insulating material, typically zirconia ceramics, the holder 15 made of metal and the bush 16 also made of metal may be electrically isolated. The ring 19A may be formed, for instance, by slicing the ceramics sleeve 17 and polishing both surfaces thereof.

The function of the ring 19A may be similar, or same as that of the insulating resin 19 in the aforementioned embodiment. That is, even when the bush 16 and the root portion of the stub 13 receive the moment from the device unit 12, the ring 19A may absorb the stress applied to the stub 13, which equivalently elongates the length for the press-fitting of the bush 16 and the holder 15 with the stub 13, and the tolerance of the optical receptacle 11 to the impact or the stress applied in perpendicular to the optical axis of the stub 13 may be enhanced.

The holder 15 and/or the bush 16 may provide a step, 15b or 16b, in a surface facing to the others as those provided in the modified first embodiments shown in FIGS. 2B and 2C. The diameter of the steps, 15b and 16b, is substantially equal to the diameter of the ring 19A, which may hold the ring 19A equally in the whole surface thereof to enhance the tolerance against the stress.

Figure 6:
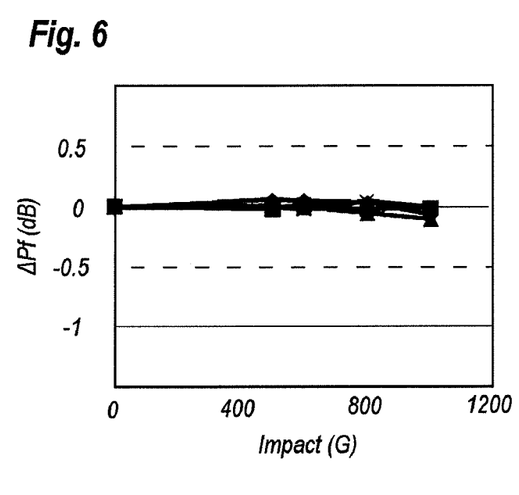
FIG. 6 shows a variance of the optical coupling efficiency of the optical receptacle according to the second embodiment of the invention.

FIG. 6 shows the variation in the optical coupling efficiency of the optical receptacle 11 with the ring 19A. In the experiment shown in FIG. 6, the arrangement of the optical receptacle 11 were same as those in the experiment shown in FIG. 5 but the gap 19 setting the ring 19A therein had a length of 0.4 mm, which was slightly greater than that in the former experiment and expected to show lesser performance for the impact applied in perpendicular to the optical axis. As shown in FIG. 6, the optical receptacle 11 with the ring 19A did not degrade the coupling efficiency thereof even the impact of 1000 G was applied in perpendicular to the optical axis.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An optical module, comprising:
an optical receptacle including a stub, a holder, and a bush, the holder and the bush being press-fitted into the stub as forming a gap therebetween; and
a device unit assembled with the bush of the optical receptacle, the device unit including at least one optical subassembly optically coupled with an external fiber set in the optical receptacle, the device unit being assembled via welding with the bush of the optical receptacle,
wherein the gap of the optical receptacle is filled with an electrically insulating resin, and
wherein, in a longitudinal direction, the bush is entirely between ends of the stub.

2. The optical module of claim 1,
wherein the electrically insulating substance is an electrically insulating ring tightly set between the bush and the holder.

3. The optical module of claim 2,
wherein the electrically insulating ring and the stub are made of material same to each other.

4. The optical module of claim 2,
wherein the electrically insulating ring is made of zirconia.

5. The optical module of claim 2,
wherein the electrically insulating ring is press-fitted into the stub.

6. The optical module of claim 1,
wherein the optical receptacle further includes a sleeve and to receive the external fiber therein and a shell to cover the sleeve,
wherein the sleeve and the shell are press-fitted between the stub and the holder.

7. The optical module of claim 1,
wherein at least one of the holder and the bush provides a step in a surface facing to each other,
wherein the step has diameter less than a diameter of the bush at points welded with the device unit.

8. The optical module of claim 1,
wherein the stub is made of ceramics.

9. The optical module of claim 1,
wherein the device unit includes a transmitter optical assembly and a receiver optical assembly.

10. The optical module of claim 1,
wherein the device unit includes a transmitter optical subassembly (TOSA) and a receiver optical subassembly (ROSA),
wherein the optical module is a bi-directional optical module.

11. The optical module of claim 1,
wherein the resin is hardened.

* * * * *